(No Model.)  2 Sheets—Sheet 1.
G. F. SCHAFFER.
Attachment for Wash Basins.
No. 237,609. Patented Feb. 8, 1881.
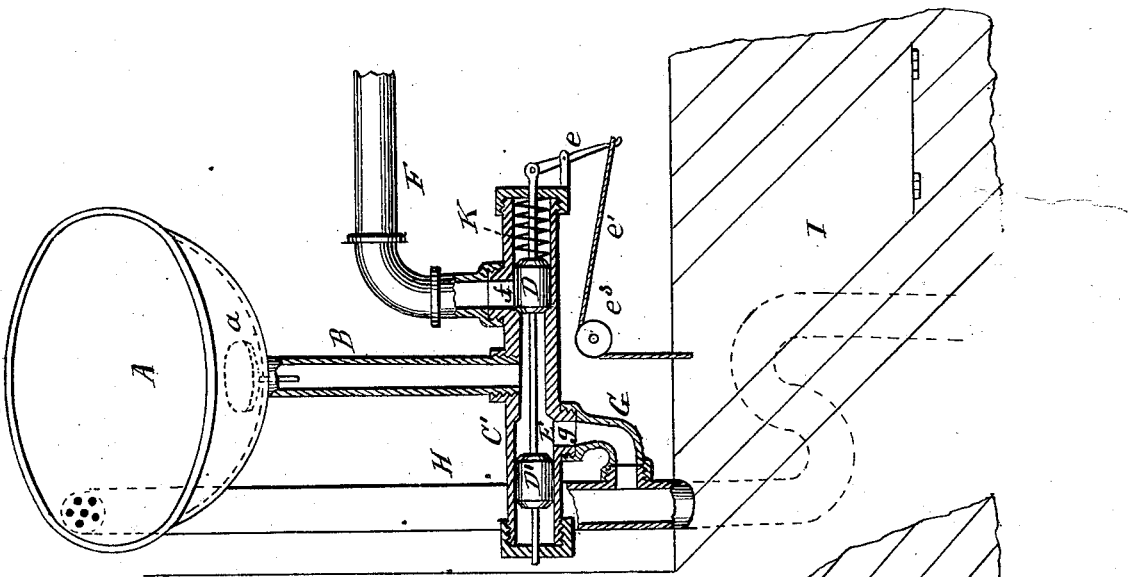
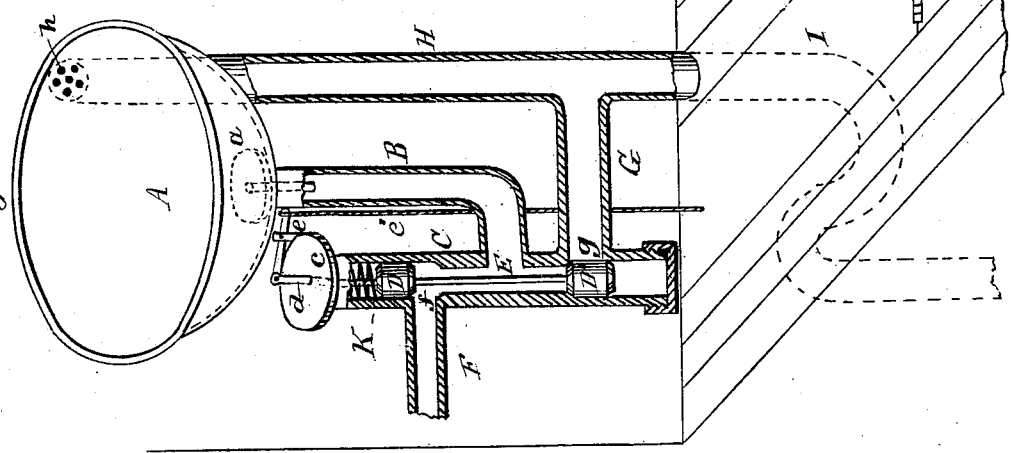
Witnesses
J. A. Rutherford
W. Beale Hale
George F. Schaffer
Inventor
By James L. Norris
Atty.
N. PETERS, PHOTO-LITHOGRAPHER, WASHINGTON, D. C.

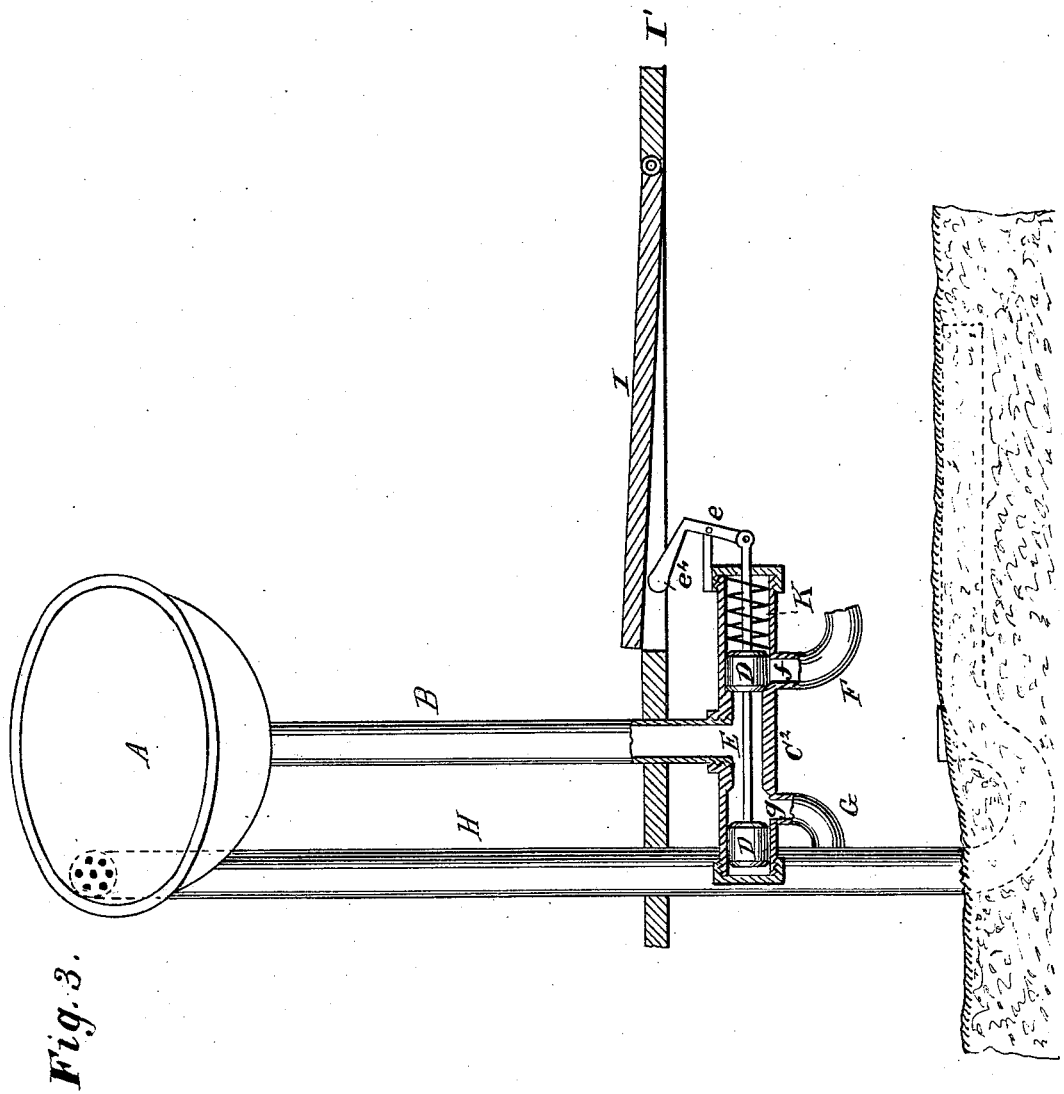

UNITED STATES PATENT OFFICE.

GEORGE F. SCHAFFER, OF WASHINGTON, DISTRICT OF COLUMBIA.

ATTACHMENT FOR WASH-BASINS.

SPECIFICATION forming part of Letters Patent No. 237,609, dated February 8, 1881.

Application filed May 28, 1880. (No model.)

*To all whom it may concern:*

Be it known that I, GEORGE F. SCHAFFER, a citizen of the United States, residing at Washington city, in the District of Columbia, have invented new and useful Improvements in Water-Supply and Waste Pipes and Valves for Water-Basins, of which the following is a specification.

This invention relates to an improved construction and arrangement of automatic water-supply and waste pipes and valves of wash-basins, urinals, and the like. Its object is to secure a copious automatic inflow of water to the bowl or basin while in use only, and the rapid discharge of the contents of the said bowl or basin after it has been used, in order that, in the first place, there will be no unnecessary flow of water from the mains, while a sufficient supply is guaranteed to absorb and carry off odor and prevent sediment; and that, in the second place, the final water may not be left long enough in the basin or bowl to exhale noisome and unhealthy vapors to a deleterious extent.

The invention consists, first, in the combination, with a water-bowl, of a barrel connecting with three pipes, the first being a supply-pipe opening into the barrel near the upper end thereof, the second being a waste-pipe leading from the barrel near its remaining end, and the third being both a supply and waste pipe, connecting the bowl with the barrel at a point intermediate of the supply and waste pipes; also two valves applied to a common stem within the said barrel, connecting with suitable operating mechanism, and arranged to open communication between the supply-pipe and barrel when their valve-stem is raised, and to close such communication and open communication between said barrel and the waste-pipe when their stem is depressed, substantially as hereinafter shown and described, and for the purpose set forth; second, in the combination, with a water-bowl provided with an overflow-opening and an inlet-pipe opening, of a deflector arranged in front of said opening to direct the water from said opening directly toward the side of the bowl where the overflow is located, whereby when the bowl is full a current will set toward said overflow and carry through it all foam and surface collections.

In the accompanying drawings, Figure 1 is a view illustrating my invention, partly in perspective and partly in section, the valves being arranged to work vertically. Fig. 2 is a similar view, showing the valves arranged to work horizontally. Fig. 3 is a similar view with the valves arranged to work horizontally under the floor.

The letter A indicates a bowl, from the bottom of which leads a pipe, B, which is both a supply and waste pipe. This pipe, as shown in Fig. 1, connects with a vertical barrel, C, at a point between the openings into said barrel of the supply-pipe F and waste-pipe G, the former of which leads from a main or other water-source, and the latter forms a junction with the overflow-pipe H and connects with a trap (shown in broken lines) under the floor, or it may be otherwise conveniently located.

In the barrel C are two valves, D and D', connected by a rod, E, and arranged to govern the supply-port $f$ and eduction-port $g$ of the barrel respectively, the valves being held at such a distance apart by the rod E that when one of said ports is open the other will be closed. A stem, $d$, connected with the valve D, extends through the head $c$, and is pivoted to one end of a lever, $e$, to the opposite end of which is connected a cord, $e'$, leading downward and attached to the free end of a hinged section, I, of the floor. Between the valve D and the head $c$ of the barrel is a coiled expansion-spring, K, having its ends bearing against the valve and the barrel-head respectively, and arranged to force the valve D normally to its seat to close the supply-port $f$, and consequently to drive valve D' from its seat to keep eduction-port $g$ normally open. When the valves occupy these relative positions the hinged section I of the floor will be raised through the cord $e'$, and when said hinged section is depressed the cord $e'$ will draw downward the end of the lever $e$ to which it is connected, thus elevating the valves against the pressure of spring K to the positions shown in Fig. 1, opening the supply-port $f$ and closing eduction-port $g$. The water will then flow from pipe F into the barrel C, thence through pipe B, which then serves as a supply-pipe to the bowl A, and will overflow from said bowl through pipe H to the trap, a full supply being kept in the bowl as long as the floor-section is depressed. As soon as said section is allowed to rise the valves will resume their normal places, and the water will then flow rapidly from the bowl through pipe B, which thus serves as a waste-pipe, to the barrel C, and thence off through the pipe G. A person approaching the bowl to use it steps upon the floor-section I and depresses it, and on leaving permits the section to rise.

At the bottom of the bowl A is located a plate, $a$, over the opening of pipe B, and so arranged as to direct the inflowing water toward the side of the bowl where the overflow-port $h$ is located, so that when the bowl is full the water will not revolve or whirl therein, but a current will set directly toward the overflow, carrying through it the foam and surface collections, and thus keeping the bowl clean.

In the modification shown in Fig. 2 the principle is precisely the same as illustrated in Fig. 1, but the barrel C' is horizontal and the connecting-pipes correspondingly arranged. The cord $e^2$ passes over a pulley, $e^3$, in order to give it a proper direction to lever $e$.

In the modification shown in Fig. 3 the barrel $C^2$ is arranged beneath the floor, which is shown in section at I'; and the operating-cord is dispensed with, the lever $e$ being provided with a bent extension, $e^4$, which terminates directly under and in the path of the hinged floor-section I, which, when a person stands upon it, depresses the extension $e^4$ to operate the lever and valves. This is obviously the most appropriate form of the apparatus for dwellings, as the barrel and moving parts are concealed and out of the way.

It is a very important feature of my improvement that the waste water is always prevented from becoming obstructed by the trash which so commonly accumulates in the bowls of urinals, (such as cigar ends, tobacco-quids, matches, bits of paper, &c.,) and which settles at the bottom of the bowl and clogs the mouth of the waste-pipe when the water passes off. All such trash which settles in the bottom of the bowl, in my invention, after it has been used by one person, will be forced away from the mouth of the pipe by the inflowing water when the valves are operated at the approach of the next user, and so the opening is kept clear for the water to pass off at the proper time.

What I claim is—

1. The combination, with a water-bowl, of a barrel, C, connecting with the three pipes F, G, and B, the first being a supply-pipe opening into the barrel near the upper end thereof, the second being a waste-pipe leading from the barrel near its remaining end, and the third being both a supply and waste pipe connecting the bowl with the barrel at a point intermediate of the supply and waste pipes, also the two valves D and D', applied to a common stem within the said barrel, connecting with suitable operating mechanism, and arranged to open communication between the supply-pipe and barrel when their valve-stem is raised, and to close such communication between said barrel and the waste-pipe G when their stem is depressed, substantially as shown and described, and for the purpose set forth.

2. The combination, with a water-bowl provided with an overflow-opening and an inlet-pipe opening, of a deflector arranged in front of said opening, to direct the water from said opening directly toward the side of the bowl where the overflow is located, whereby when the bowl is full a current will set toward said overflow, substantially as and for the purpose set forth.

In testimony whereof I have hereunto set my hand in the presence of two subscribing witnesses.

GEORGE F. SCHAFFER.

Witnesses:
JAMES L. NORRIS,
JAMES A. RUTHERFORD.